May 15, 1951

F. T. POWERS, SR 2,553,209

PLATE POWDERING MACHINE

Filed Jan. 21, 1949

INVENTORS
Frank T. Powers, Sr., Dec'd
by Frank T. Powers, Jr, and
John M. Powers, Executors

BY

Morgan, Finnegan & Durham
ATTORNEYS.

May 15, 1951      F. T. POWERS, SR      2,553,209
PLATE POWDERING MACHINE

Filed Jan. 21, 1949      4 Sheets-Sheet 3

INVENTORS
Frank T. Powers, Sr, Dec'd
by Frank T. Powers, Jr and
John M. Powers, Executors BY
Morgan, Finnegan & Durham
ATTORNEYS.

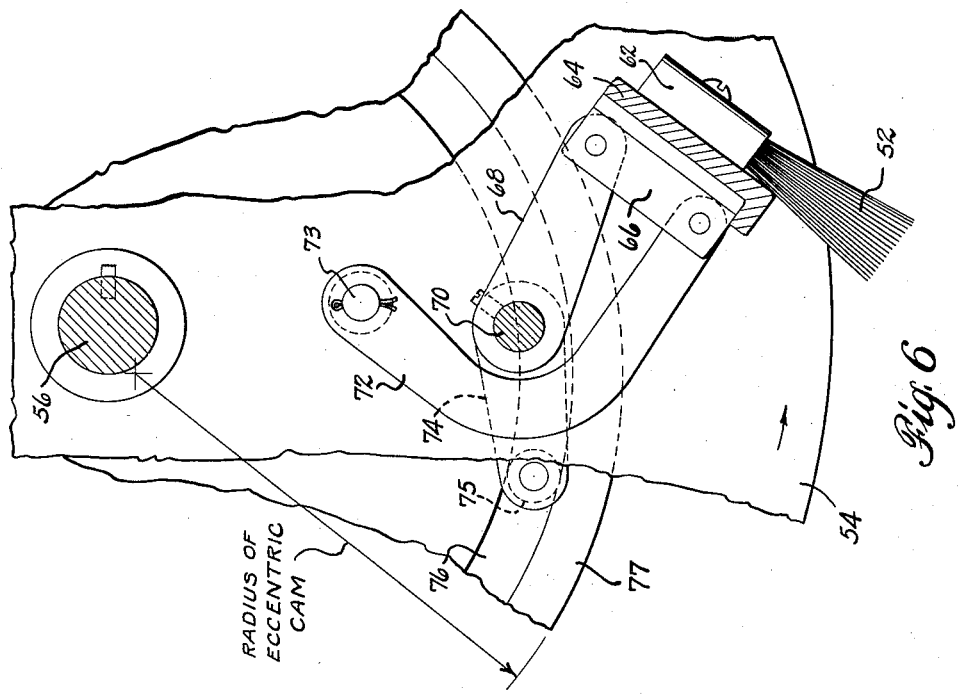
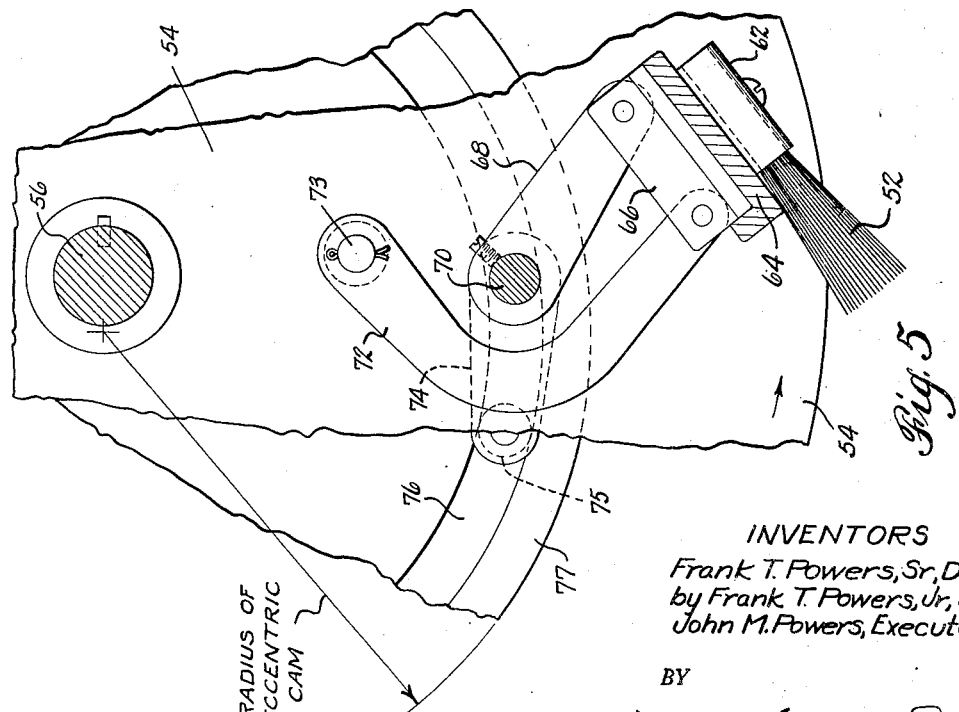
INVENTORS
Frank T. Powers, Sr., Dec'd
by Frank T. Powers, Jr., and
John M. Powers, Executors
BY
Morgan, Finnegan + Durham
ATTORNEYS.

Patented May 15, 1951

2,553,209

UNITED STATES PATENT OFFICE 2,553,209

PLATE POWDERING MACHINE

Frank T. Powers, Sr., deceased, late of Glen Cove, N. Y., by Frank T. Powers, Jr., Locust Valley, and John M. Powers, Glen Cove, N. Y., executors, assignors to Powers Photo Engraving Company, a corporation of New York Application January 21, 1949, Serial No. 72,012

6 Claims. (Cl. 91—59)

The present invention relates to a new and improved apparatus for powdering photoengravings and more particularly to an improved mechanism for properly distributing powdered resin, such as dragon blood, over the surface of a photoengraved plate.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate the preferred embodiment of the invention, and together with the description, serve to explain the principles of the invention.

Of the drawings:

Figure 5 is a fragmentary, enlarged vertical section as viewed from the section plane 5—5 of Figure 2 and illustrating the relative position of one of the brush rows at a particular setting of the cam which controls said position; and Figure 6 is similar to Figure 5 but shows the brush row position at a different setting of the controlling cam.

Figure 1:
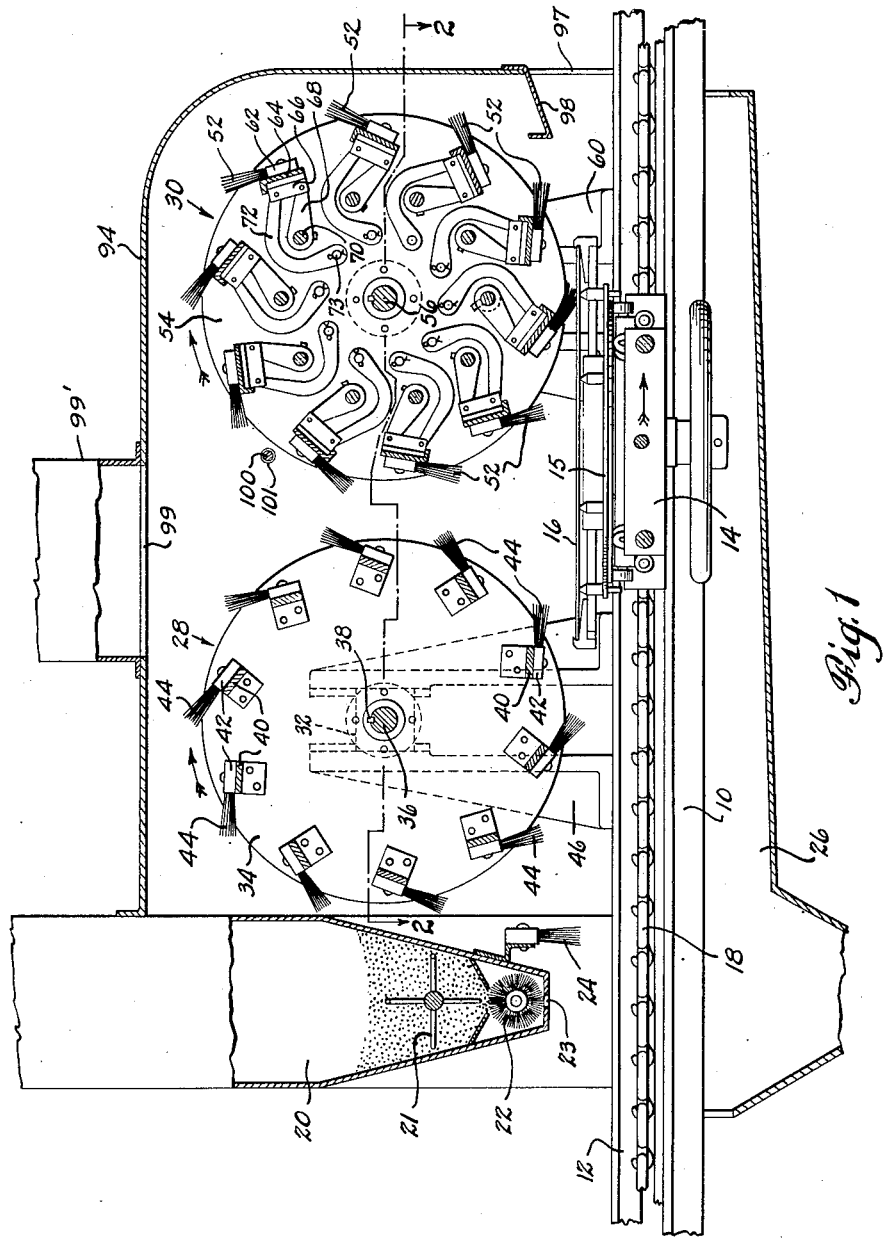
Figure 1 is a longitudinal vertical section taken along the line 1—1 of Figure 2 and illustrates that portion of a machine for powdering photoengravings which serves to apply and distribute the powder previous to further processing of the powdered plate.
Figure 2:
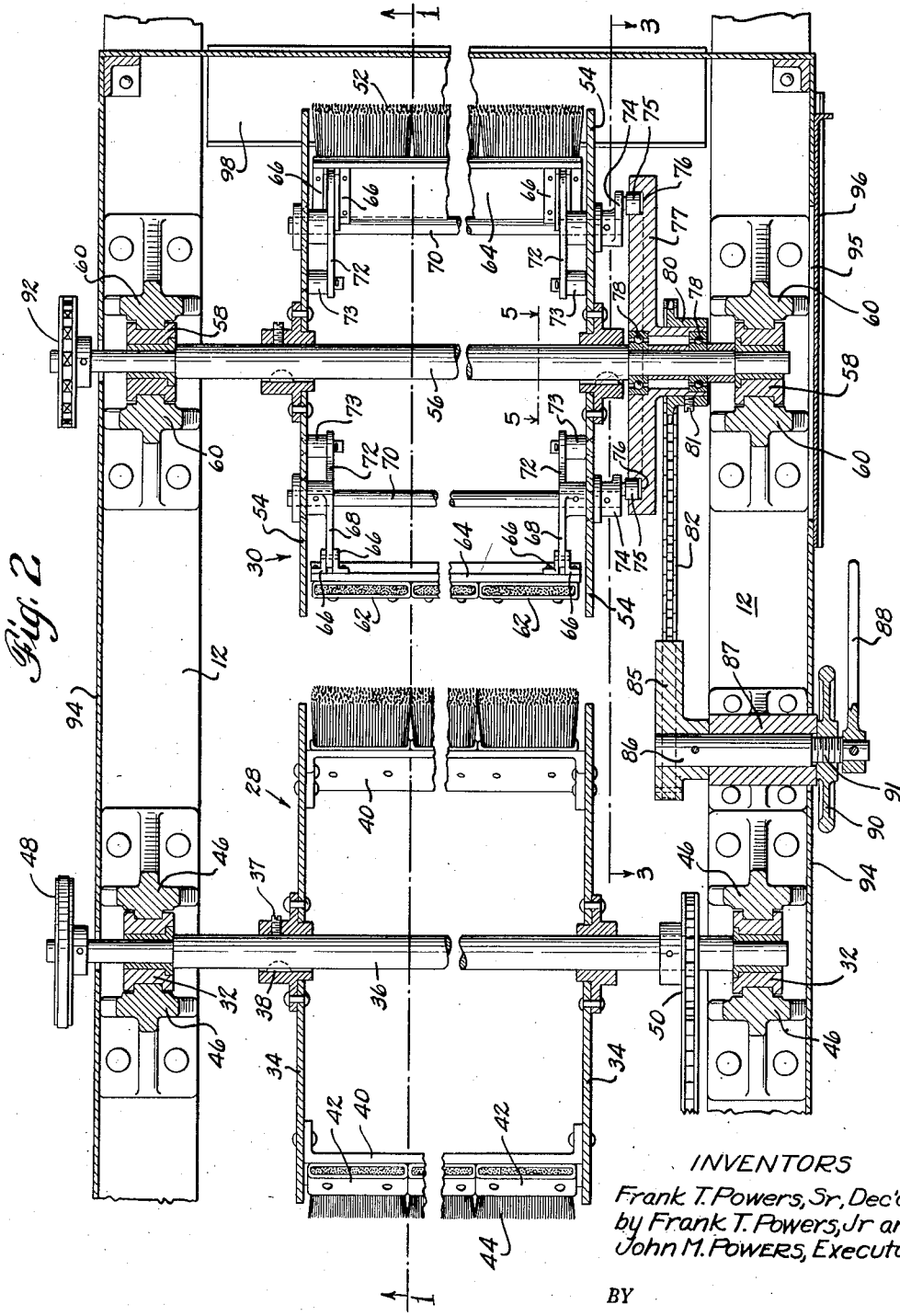
Figure 2 is a plan section taken along the line 2—2 of Figure 1, with certain structures in the background below the section plane being omitted for the sake of clarity.

The present invention is particularly adapted for use in connection with a continuously operating "four-way powdering" machine, such as that disclosed in co-pending application Serial No. 51,963 filed September 30, 1948, and has for its object the provision of improved brushing means whereby the powdered resin ("dragon's blood") sprinkled on an initially etched photoengraved plate is more evenly and uniformly distributed on the plate in each of the four desired directions thereon as the plate is passed beneath the brushing means four successive times with a 90° rotation of the plate between each successive passage.

A further object is to provide powder distributing means which may be selectively adjusted so that the angle at which each brush row of a brush drum successively engaging the engraved plate may be quickly and easily changed. By the provision of this adjustability a single powdering machine may be adapted for processing series of plates in which successive series have different surface characteristics requiring either stiffer or gentler brush action for properly distributing the powder thereon.

A further object is to provide a plurality of brush drums arranged in tandem and so driven that their relative speeds may be varied as plate surface conditions require.

In accordance with the preferred embodiment of the present invention a pair of rotatably mounted brush drums are positioned in tandem within an exhaust hood and just above the path of travel of an engraved plate to be powdered. Each drum consists of a plurality of equally spaced rows of brushes parallel with the drum axis and with the brush bristles extending outwardly and rearwardly relative to their direction of rotation. The brush drums are rotated in such direction that the brush rows adjacent a plate passing beneath move in the opposite direction to plate movement.

The brush drum which acts first on a plate passing through the powdering machine serves to give an initial, somewhat coarse, distribution of the powdered resin and therefore is provided with brush rows which are in fixed angular position about the drum. The following or final brush drum to act on the passing plate is provided with brush rows which are pivotally mounted in the drum so that the angle at which the bristles engage the plate may be varied manually at an initial setting of the machine and in accordance with the plate characteristics. Thus the final distribution of the powder may be controlled to suit any type of plate and to any fineness of distribution desired.

It is to be noted that the angular dispositions of the brush rows around a relatively large diameter drum combine to provide a brushing action which simulates that of a highly skilled hand-brushing but is superior thereto in that all brush strokes may be absolutely uniform in direction and pressure.

It will be understood that the foregoing general description and the following detailed description as well are exemplary and explanatory of the invention but are not restrictive thereof.

Referring now in detail to the present illustrative and preferred embodiment of the invention as shown in the accompanying drawings, there is shown a portion of a conveyor track 10 and frame members 12 of a powdering machine. A plate carriage 14, having a rotatable plate supporting table 15 upon which an engraved plate 16 is clamped, is secured on each side to a conveyor chain 18 adapted to be driven along track 10 at a constant speed. A plurality of plate carriages 14 may be provided in spaced relation along conveyor chains 18 and the movement of the latter serves to carry the plate carriages 14 and plate 16 through the powdering machine for the various steps in the powdering process.

Near the front or loading end of the powdering machine, left in Figure 1, a powder supply hopper 20 is provided and supported on frame members 12 just above the travel path of the plate to be processed. Hopper 20 may be provided with an agitator 21, rotary feed brush 22 and feed orifice 23. The agitator 21 and feed brush 22 may be driven in any desired manner and controlled so that powder feed takes place only during the time the plate 16 is passing beneath the orifice 23.

A brush 24, fixed to the rear side of hopper 20, serves to sweep a large portion of the excess powder off the plate and give a coarse distribution of the powder remaining on the plate. Excess powder thus removed may be collected in a tray 26 from which it may be gathered and returned to hopper 20 for further use.

In a powdering machine such as one to which the present invention may be applied, the first powdering and processing operation on the plate is usually performed after the plate has been given an initial "bite," at which time the depth of the etched portions may be about .001 of an inch. Additional powdering operations may be performed after additional etching operations and in many cases the depth of the etching at the time of a final powdering operation may be as great as .010 of an inch.

After the plate 16 has been initially swept by brush 24 the surface is subjected to the action of a plurality of rotating brush drums each of which sweeps powder across the plate surface and off the rear edge thereof. In the form of invention shown two such rotating drums 28 and 30 are shown. Brush drum 28, first in relation to plate travel, is arranged to rotate somewhat slower than the following brush drum 30 and the combined action of the two drums serves to remove more and more powder from the plate surface and progressively compact the remaining powder against the upstanding edges of the unetched portions of the plate against which the brushes sweep, that is against the forward sides, right in Figure 1, of the dots, lines or other unetched portions of the plate.

Brush drum 28, rotatably supported on each side in bearing blocks 32, consists of spaced apart end discs 34 the hubs of which are mounted on a drum shaft 36. One or both of the hubs of end discs 34 is fixed to shaft 36 as by set screws 37 and key 38. The relatively large diameter end discs 34 act as supports for and are secured to each other by a plurality of brush supporting bars 40 having inturned ends to which the end discs 34 may be riveted or otherwise secured. Brush bars 40, shown as ten in number, are equally spaced around the discs 34 parallel to the shaft 36 and near the periphery of the discs. Each bar 40 has a row of individual bristle holders 42 fixed thereto, end to end, for substantially the whole distance between discs 34 so that together the bristles comprise a single uninterrupted brush row 44 for the length of each brush bar 40. The angle at which each bar 40 is secured to end discs 34 is such that the row of fairly long and flexible bristles 44, mounted on the bar, is positioned to engage lightly the upper surface of the plate 16 as it is passed beneath drum 28 by chains 18. The bristles 44 extend outwardly and rearwardly with respect to their rotational movement so that as they engage the plate the bristle ends are flexed and sweep over the plate surface at an acute angle thereto. As the rotation of the brush rows continue the angle of contact with the plate increases slightly until the brush row rises off the plate surface.

The bearing blocks 32, in which the drum shaft 36 is journalled, are adjustably fixed in brackets 46 in a conventional manner, as shown, and the brackets 46 secured to frame members 12. Rotation of drum 28 is effected by a driven pulley 48 fixed on a projecting end of shaft 36. A sprocket and chain assembly 50, mounted on the opposite end of shaft 36 may be used to drive mechanism (not shown) for actuating the hopper feed brush 22 and agitator 21.

The proportions and speed of rotation of brush drum 28 are so arranged that the initial rotative brushing action to which the drum subjects the plate 16 removes most but not all of the powdered resin on the plate except the portion which has been compacted on the upstanding forward edges of the unetched dots, lines and plateaus. It then remains to clean off all the remaining powder except the compacted portions just referred to and also to further compress these compacted portions, and it is to this purpose that the second brush drum 30 is provided.

It is highly desirable that the final brushing action on any plate, previous to processing the compacted powder thereon, will remove all traces of powder from areas where it is not wanted. One group or series of plates to be processed may have more residual unwanted powder thereon after the initial action of brush drum 28 than a precedingly processed group and the final brushing action of drum 30 on the one group may be too weak or too strong for another group. Therefore, the efficiency of a powdering machine depends, in part, upon the ease and quickness with which a change can be made to increase or decrease, even minutely, the angle of brush engagement to plate and hence the ability of the brush to remove all the unwanted and none of the wanted powder and to give the final desired degree of compactness to the functional powder remaining.

To this end the brush drum 30, which gives the plate 16 its final sweep, is provided with a plurality of brush rows 52 having an angle of plate engagement which may be rapidly and readily altered to suit any plate condition. As embodied, brush drum 30 consists of two relatively large diameter end discs 54 having central hubs by which they are secured in spaced relation on drum shaft 56 which, in turn, is journalled in bearing blocks 58 adjustably fixed in brackets 60. Between end discs 54 and supported by them is a plurality of brush rows 52, similar to brush rows 44 of drum 28. Each brush row 52 is comprised of individual bristle holders 62 secured, end to end, on a brush bar 64 which extends the full distance between end discs 54 parallel to the drum shaft 56.

Means are provided for mounting brush rows 52 on discs 54 so as to rotate therewith yet be movable in relation thereto to permit changing the angle at which the brush row engages the plate 16. As embodied, each brush bar 64 is provided at each end with a pair of depending angle brackets 66. Between each pair of brackets 66 at one end thereof is pivoted the outer end of an actuator arm 68 the inner end of which is fixed to an actuator shaft 70. Shaft 70 is journalled in the end discs 54. At the other end of each pair of brackets 66 is pivoted the outer end of a goose neck arm 72 the inner end of which is pivotally mounted on a stud 73 fixed on the inner face of end disc 54 and nearer drum shaft 56 than is actuator shaft 70.

The actuator arms 68 and goose neck arms 72 are so proportioned and positioned that each brush row 52 supported thereby has its bristles directed outwardly and rearwardly in respect to rotational movement so that their engagement with the plate 16 causes them to flex and sweep over the plate surface at a pre-selected angle.

Means are provided for maintaining the sweep angle of each brush row 52 as it passes over the plate 16 during rotation of drum 30. As embodied, each actuator shaft 70 is extended, at one end, a short distance outside of its journal in one end disc 54 and is provided with a cam arm 74 fixed on shaft 70 and carrying a cam roller 75. Roller 75 is adapted to ride in a cam groove 76 formed in the inner face of a normally stationary cam 77. Cam 77 may be conveniently journalled on drum shaft 56 by ball bearings 78 which serve to maintain proper longitudinal alignment of the cam but still permit rotation of the drum shaft 56. Cam groove 76 is preferably, though not necessarily, circular but is eccentric with respect to the center of drum shaft 56.

The center of cam groove 76, when the cam is set for a median brush sweep angle, may be in the same horizontal plane as the center of drum shaft 56 and either to the front or rear thereof. As shown in Figure 5 it is shown to the left or rear in terms of the powdering machine as a whole. Thus, as drum 30 rotates the position of each actuator arm 68 and associated brush row 52 is determined by the relative position of that portion of cam groove 76 in which cam roller 75 happens to be. Thus, in the course of one revolution of brush drum 30 each brush row 52 is shifted from a minimum to a maximum angle but during the relatively short period of this revolution in which the brush is engaging the plate 16 the shift of this sweep angle of the brush is minute and negligible. However, if the center of the eccentric cam groove 76 is shifted relative to the center of brush rotation, as shown in Figure 6, the sweep angle of the brush during the same short period mentioned above will be different and greater or less depending upon which way and how much the cam center is shifted.

Thus if stiff brush action is needed to effect proper sweeping of the plate 16 the cam groove center may be shifted by rotation counter-clockwise from the median position shown in Figure 5 to that shown in Figure 6 and clockwise if a more gentle brushing action is desired.

Means are provided for manually changing the position of cam 77 and locking it in its desired setting whether the brush drum 30 is rotating or stationary. As embodied, a sprocket 80 is fixed to the hub of cam 77, as by set screw 81, and has a chain 82 meshing therewith. Chain 82 is non-continuous and has its ends 83, 84 pivotally secured at substantially diametrically opposite points on the periphery of an actuator plate 85 which is spaced an operable distance away from sprocket 80. Plate 85 is pinned to one end of a stub shaft 86 which is journalled in a stanchion 87 carried by and secured to one of the frame members 12. A hand lever 88 is pinned to the outer end of stub shaft 86 within convenient reach of an operator. A hand wheel 89 having an internally threaded hub is mounted on a reduced threaded portion 91 of the stub shaft 86 and between hand lever 88 and stanchion 87. Rotation of hand wheel 89 in the proper direction will thus clamp the actuator plate 85 and stub shaft 86 in any desired fixed position.

To change the position of cam 77, therefore, the hand wheel 89 is first loosened and the hand lever 88 raised or lowered a desired amount. The corresponding partial rotation of actuator plate 85 causes the attached chain 82 to give a partial rotation to sprocket 80 and cam 77. When the desired setting of cam 77 is obtained and the sweep angle of brush rows 52 performing satisfactorily the hand wheel 89 is tightened to lock all the associated parts in their set position.

Rotation of brush drum 30 is effected by a driven sprocket 92 fixed on an extended end of drum shaft 56.

Provision is made to prevent undesired floating dust and powder from settling on the plate 16 after the final brushing action. A hood 94 covering both brush drums 28 and 30 is provided and supported on frame members 12. Appropriate openings in hood 94 are formed as passageways for necessary operating parts, one such opening 95 being large enough for use as an inspection port and closable by a sliding door 96 when not so used. Another passageway 97, permitting exit of the plate 16 from the hood 94 may be provided with a tray 98 for collecting dust which may sift down along the rear inner surface of hood 94. An opening 99 centrally disposed in the top of hood 94 and having an upstanding collar 99' may be provided for attaching an exhaust conduit (not shown) to draw off objectionable floating dust and powder.

A brush cleaning rod 100 carrying a coiled wire 101 may be provided to extend across the hood 94 parallel to the axis of the brush drum 30 and close enough thereto so that each passing brush row 52 may gently strike it, thus loosening and removing any adhering dust or powder.

Figures 3, 4:
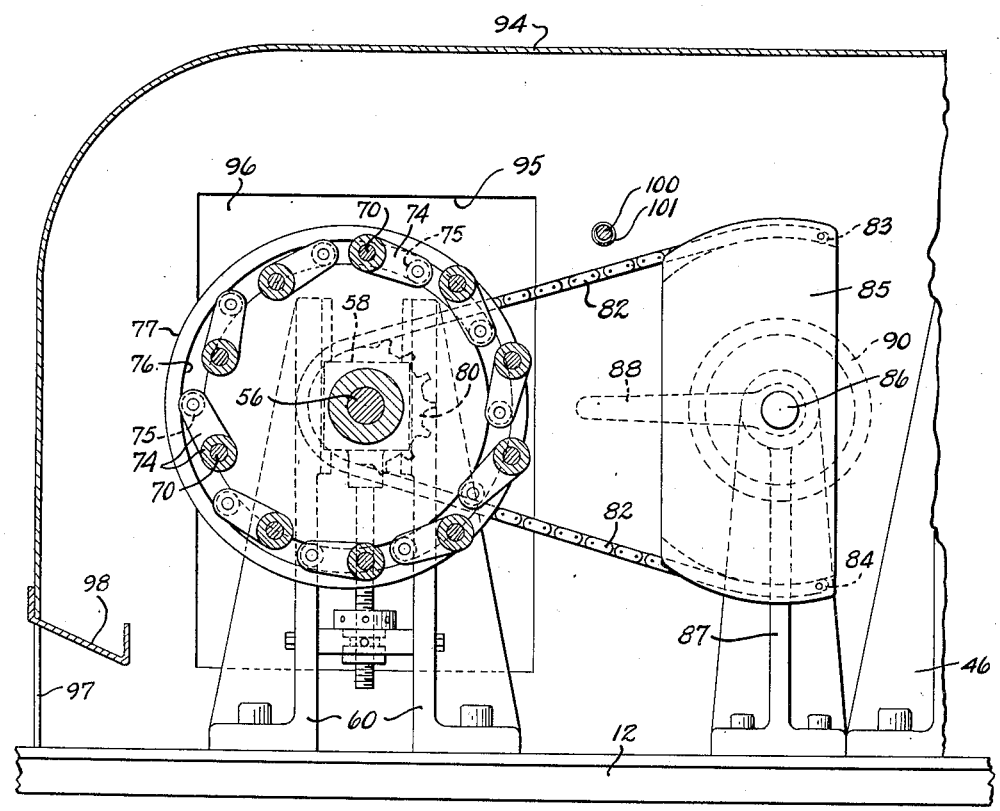
Figure 3 is a fragmentary vertical section taken along the line 3—3 of Figure 2.
Figure 4 is a schematic side elevation showing means for driving the brush elements which distribute the powders.

Referring now to Figure 4 there is indicated somewhat schematically a means for driving the two brush drums 28 and 30 at different speeds from each other and permitting the speed of the final brushing drum 30 to be adjusted to such speed as a particular plate condition calls for. A common drive motor 102 may be provided and drives a jack shaft 103 through a belt 104 and pulley 106. Also fixed on jack shaft 103 is a large sprocket 108 and a smaller pulley 110. Small pulley 110 drives brush drum 28 through a belt 112 trained over pulley 110 and pulley 48 on end of drum shaft 36. Large sprocket 108 and chain 114 drives the input shaft 116 of a speed changing device 118, as for instance a Reeves variable speed mechanism. A sprocket 120 on the outer end of the output shaft of speed changing device 118 drives brush drum 30 by means of a chain 122 and sprocket 92 which is fixed on the end of drum shaft 56. Thus, as conditions of plate surface warrant the speed of final brush drum 30 may be changed in relation to drum 28 by an adjustment of speed changing device 118, the mechanism of which is conventional and not shown.

*Operation*

The operation of the above described invention is as follows: A plate 16 is loaded and clamped on rotatable table 15 of plate carriage 14. Conveyor chains 18 then carry plate 16 beneath hopper 20 where powdered resin is sprinkled over its entire upper surface. Plate 16 then passes beneath stationary brush 24 where a large portion of the excess powder is swept off the rear edge of the plate into tray 26. Most of the remaining excess powder is removed as the plate moves under brush drum 28 and the powder which is dammed against removal by the leading edges of the upstanding unetched dots, lines and plateaus of plate 16 is firmly compacted against these edges.

Continued travel of plate 16 brings it beneath final brushing drum 30 where all the powder is removed from all horizontal surfaces and the compacted powder aforementioned given a final definitive and tamping brushing. The plate then passes through the powdering machine to receive the rest of the steps in its processing.

Before the plate again approaches the hopper 20 it is rotated 90° by mechanism (not shown) after which it is moved for the second time beneath hopper 20 and brushes 28 and 30. This time, however, a second side of the unetched dots and lines of the plate 16 is presented for its measure of compacted powder. The operation is repeated twice more, the plate of course being rotated 90° between each passage beneath the brush drums. Thus all four vertical sides of the unetched dots and lines are powdered and processed and the plate then removed from the machine for further etching.

If a further powdering is desired after the plate has been re-etched the above operations may be repeated but the deeper etching of these plates may require an adjustment of the sweep angle of brush rows 52 of the final brushing drum 30. If so, hand wheel 90 is loosened, hand lever 88 moved to shift cam 77 to a new position and the wheel 90 again tightened. Brush rows 52 then act on plate 16 slightly harder or softer as plate conditions require.

The invention in its broader aspects is not limited to the specific mechanism shown and described but departures may be made therefrom within the scope of the accompanying claims without departing from the principles of the invention and without sacrificing its chief advantages.

What is claimed is:

1. In a plate powdering machine, the combination of a rotary member, a plurality of brush rows pivoted on the rotary member with their bristles projecting beyond the rotary member to contact with a plate moved beneath the rotary member, a support for the moving plate, means for variably spacing the rotary member with respect to the supported plate, and means for variably controlling the angle of the brush rows to vary the angle with which the bristles engage the surface of the plate.

2. The plate powdering machine of claim 1, in which the means for controlling the angle of the brush rows includes a stationary cam which controls the angular position of the brushes about their pivots and means are provided for shifting the cam while the rotary member is driven.

3. In a plate powdering machine, the combination of a rotary member, a plurality of brush rows pivoted on the rotary member with their bristles projecting beyond the rotary member to contact with a plate moved beneath the rotary member, a cam mounted adjacent the rotary member, and arms connected to the brush rows and running on said cam to vary the projection of the bristles beyond the rotary member.

4. The plate powdering machine of claim 3 in which means are provided for moving said cam to vary the time of projection of the bristles from the rotary member.

5. The plate powdering machine of claim 4 in which another rotary brush member operates on the plate prior to said rotary member, and means are provided for driving the two rotary members at different relative speeds.

6. The plate powdering machine of claim 3 in which another rotary brush member operates on the plate prior to said rotary member, and means are provided for driving the two rotary members at different relative speeds.

FRANK T. POWERS, Jr.,
JOHN M. POWERS,
*Executors of the Estate of Frank T. Powers, Sr., Deceased.*

REFERENCES CITED

The following references are of record in the file of this patent:

UNITED STATES PATENTS

| Number | Name | Date |
|---|---|---|
| 800,225 | Levy | Sept. 26, 1905 |
| 1,290,603 | Logan | Jan. 7, 1919 |
| 1,638,566 | Congdon | Aug. 9, 1927 |
| 1,724,671 | Logan | Aug. 13, 1929 |
| 2,017,510 | Powers | Oct. 15, 1935 |